United States Patent
Stella et al.

(10) Patent No.: US 10,341,194 B2
(45) Date of Patent: Jul. 2, 2019

(54) SYSTEM AND METHOD FOR BUILDING, OPTIMIZING, AND ENFORCING INFRASTRUCTURE ON A CLOUD BASED COMPUTING ENVIRONMENT

(71) Applicant: FUGUE, INC., Frederick, MD (US)

(72) Inventors: Josha Stella, Shepherdstown, WV (US); Dominic Zippilli, Frederick, MD (US); Emily Dresner-Thornber, Frederick, MD (US); Denison Wright, Frederick, MD (US); Wayne Crissman, Frederick, MD (US); Matthew Brinkman, Martinsburg, WV (US); Nathan McCourtney, Frederick, MD (US); Alexander E. Schoof, Herndon, VA (US); Daniel Kerrigan, Frederick, MD (US); Jared Tobin, Auckland (NZ); Jasper Van Der Jeugt, Zurich (CH); Maciej Wos, Hong Kong (CN); Christopher Kaminski, Philadelphia, PA (US); Tyler Drombosky, Washington, DC (US)

(73) Assignee: FUGUE, INC., Frederick, MD (US)

( * ) Notice: Subject to any disclaimer, the term of this patent is extended or adjusted under 35 U.S.C. 154(b) by 77 days.

(21) Appl. No.: 15/215,409

(22) Filed: Jul. 20, 2016

(65) Prior Publication Data
US 2017/0099191 A1    Apr. 6, 2017

Related U.S. Application Data

(60) Provisional application No. 62/237,432, filed on Oct. 5, 2015.

(51) Int. Cl.
*H04L 12/24* (2006.01)
*H04L 29/08* (2006.01)
*G06F 9/50* (2006.01)

(52) U.S. Cl.
CPC .......... *H04L 41/145* (2013.01); *G06F 9/5072* (2013.01); *G06F 9/5077* (2013.01); *H04L 67/10* (2013.01)

(58) Field of Classification Search
CPC ....... H04L 41/145; H04L 67/10; H04L 67/00; H04L 51/00; G06F 9/5072; G06F 9/50;
(Continued)

(56) References Cited

U.S. PATENT DOCUMENTS

| 5,680,547 A | 10/1997 | Chang |
|---|---|---|
| 6,199,203 B1 | 3/2001 | Saboff |

(Continued)

FOREIGN PATENT DOCUMENTS

| EP | 2 439 687 | 4/2012 |
|---|---|---|
| GB | 2499193 | 8/2013 |

(Continued)

OTHER PUBLICATIONS

Stella et al., U.S. Office Action dated Dec. 6, 2013, directed to U.S. Appl. No. 13/969,158; 15 pages.
(Continued)

*Primary Examiner* — Tu T Nguyen
(74) *Attorney, Agent, or Firm* — Morrison & Foerster LLP

(57) ABSTRACT

A method for building, optimizing, and maintaining a computing infrastructure on a cloud computing environment is provided. A user provides a high-level declaration to a cloud environment operating system, specifying the details of the infrastructure that is intended to be built on the cloud. A cloud environment operating system converts the high level declaration to a lower level declaration and then to a series of instructions that can be executed by the cloud to build the desired infrastructure. The cloud environment operating system can also continuously monitor the infrastructure once
(Continued)

it is built on the cloud. If the cloud environment operating system notices any discrepancies between the user's original specification and the infrastructure as built on the cloud, the operating system can work to modify the existing infrastructure on the cloud to conform to the infrastructure specified by a user.

37 Claims, 10 Drawing Sheets

(58) Field of Classification Search
CPC ......... G06F 17/30554; G06F 17/30598; G06F 17/30424
USPC ....................................................... 709/224
See application file for complete search history.

(56) References Cited

U.S. PATENT DOCUMENTS

| | | | |
|---|---|---|---|
| 6,272,499 B1 | 8/2001 | Wooten | |
| 6,501,995 B1 | 12/2002 | Kinney et al. | |
| 7,188,163 B2 | 3/2007 | Srinivasan et al. | |
| 7,275,213 B2 | 9/2007 | Katano | |
| 7,284,274 B1 | 10/2007 | Walls et al. | |
| 7,350,207 B2 | 3/2008 | Fisher | |
| 7,486,678 B1 | 2/2009 | Devanagondi et al. | |
| 7,533,377 B2 | 5/2009 | Appavoo et al. | |
| 7,571,120 B2 | 8/2009 | Fellenstein et al. | |
| 7,735,078 B1 | 6/2010 | Vaidya | |
| 7,739,155 B2 | 6/2010 | Fellenstein et al. | |
| 8,032,846 B1 * | 10/2011 | Balasubramanian | ........................ G06F 17/5045 716/100 |
| 8,218,539 B2 | 7/2012 | Dai | |
| 8,615,584 B2 | 12/2013 | Dawson et al. | |
| 8,676,621 B1 | 3/2014 | Helfrich et al. | |
| 8,745,746 B1 | 6/2014 | Jain | |
| 8,755,522 B2 | 6/2014 | Stella et al. | |
| 8,819,836 B2 | 8/2014 | Stella et al. | |
| 9,003,372 B2 | 4/2015 | Stella et al. | |
| 9,003,525 B2 | 4/2015 | Stella et al. | |
| 9,014,373 B2 | 4/2015 | Stella et al. | |
| 9,385,866 B2 | 7/2016 | Stella et al. | |
| 9,461,823 B2 | 10/2016 | Stella et al. | |
| 9,508,095 B2 | 11/2016 | Stella et al. | |
| 9,800,465 B2 * | 10/2017 | Steinder .............. H04L 41/0813 | |
| 9,847,878 B2 | 12/2017 | Stella et al. | |
| 2002/0154781 A1 | 10/2002 | Sowa et al. | |
| 2002/0178375 A1 | 11/2002 | Whittaker et al. | |
| 2002/0188935 A1 | 12/2002 | Hertling et al. | |
| 2003/0115123 A1 | 6/2003 | Lang | |
| 2003/0147369 A1 | 8/2003 | Singh et al. | |
| 2003/0156718 A1 | 8/2003 | Candelore et al. | |
| 2004/0210769 A1 | 10/2004 | Radatti et al. | |
| 2004/0255290 A1 | 12/2004 | Bates et al. | |
| 2005/0022023 A1 | 1/2005 | Chincheck et al. | |
| 2006/0165232 A1 | 7/2006 | Burazerovic et al. | |
| 2006/0282897 A1 | 12/2006 | Sima et al. | |
| 2007/0016961 A1 | 1/2007 | Vogler et al. | |
| 2007/0033420 A1 | 2/2007 | Sherwani et al. | |
| 2007/0091926 A1 | 4/2007 | Apostolopoulos et al. | |
| 2007/0100905 A1 | 5/2007 | Masters et al. | |
| 2007/0136455 A1 | 6/2007 | Lee et al. | |
| 2007/0162541 A1 | 7/2007 | Dhawan et al. | |
| 2007/0242620 A1 | 10/2007 | Zhai | |
| 2007/0250582 A1 | 10/2007 | Sidhu et al. | |
| 2008/0022374 A1 | 1/2008 | Brown et al. | |
| 2008/0092235 A1 | 4/2008 | Comlekoglu | |
| 2008/0095149 A1 | 4/2008 | Dai | |
| 2008/0134177 A1 | 6/2008 | Fitzgerald et al. | |
| 2008/0229300 A1 | 9/2008 | O'Brien | |
| 2008/0263658 A1 | 10/2008 | Michael et al. | |
| 2009/0076628 A1 | 3/2009 | Smith et al. | |
| 2009/0125897 A1 | 5/2009 | Matlin et al. | |
| 2009/0254900 A1 | 10/2009 | Nakamura | |
| 2009/0319773 A1 | 12/2009 | Frenkel et al. | |
| 2010/0050172 A1 | 2/2010 | Ferris | |
| 2010/0083240 A1 | 4/2010 | Siman | |
| 2010/0145864 A1 | 6/2010 | Boesjes | |
| 2010/0195663 A1 | 8/2010 | Sharma et al. | |
| 2010/0262950 A1 | 10/2010 | Garland | |
| 2010/0325622 A1 | 12/2010 | Morton | |
| 2010/0332262 A1 | 12/2010 | Horvitz et al. | |
| 2011/0064081 A1 | 3/2011 | Lee et al. | |
| 2011/0119104 A1 | 5/2011 | Levine et al. | |
| 2011/0138050 A1 | 6/2011 | Dawson et al. | |
| 2011/0138051 A1 | 6/2011 | Dawson et al. | |
| 2011/0154313 A1 | 6/2011 | Nolterieke et al. | |
| 2011/0209131 A1 | 8/2011 | Hohenstein et al. | |
| 2011/0231899 A1 | 9/2011 | Pulier et al. | |
| 2011/0258701 A1 | 10/2011 | Cruz et al. | |
| 2011/0296391 A1 | 12/2011 | Gass et al. | |
| 2011/0321028 A1 | 12/2011 | Evans et al. | |
| 2012/0016721 A1 | 1/2012 | Weinman | |
| 2012/0054345 A1 | 3/2012 | Sahu et al. | |
| 2012/0066672 A1 | 3/2012 | Smith et al. | |
| 2012/0079472 A1 | 3/2012 | Lenger | |
| 2012/0131139 A1 | 5/2012 | Siripurapu et al. | |
| 2012/0166582 A1 | 6/2012 | Binder | |
| 2012/0185913 A1 | 7/2012 | Martinez et al. | |
| 2012/0192253 A1 | 7/2012 | Betsch et al. | |
| 2012/0243533 A1 | 9/2012 | Leong | |
| 2012/0271874 A1 | 10/2012 | Nugent | |
| 2012/0290460 A1 | 11/2012 | Curry, Jr. et al. | |
| 2012/0317416 A1 | 12/2012 | Shetty et al. | |
| 2013/0031028 A1 | 1/2013 | Martin | |
| 2013/0081007 A1 | 3/2013 | Charters et al. | |
| 2013/0138812 A1 * | 5/2013 | Assuncao .................. G06F 9/50 709/226 |
| 2013/0205020 A1 | 8/2013 | Broda et al. | |
| 2013/0346227 A1 | 12/2013 | Jain et al. | |
| 2014/0033308 A1 | 1/2014 | Sawyer et al. | |
| 2014/0040885 A1 | 2/2014 | Donahue | |
| 2014/0047546 A1 | 2/2014 | Sidagni | |
| 2014/0052979 A1 | 2/2014 | Stella et al. | |
| 2014/0053273 A1 | 2/2014 | Stella et al. | |
| 2014/0053274 A1 | 2/2014 | Stella et al. | |
| 2014/0067496 A1 | 3/2014 | Buswell | |
| 2014/0067772 A1 | 3/2014 | Sabbouh et al. | |
| 2014/0229221 A1 | 8/2014 | Shih et al. | |
| 2014/0241380 A1 | 8/2014 | Bennett et al. | |
| 2014/0278808 A1 | 9/2014 | Iyoob et al. | |
| 2014/0380043 A1 | 12/2014 | Stella et al. | |
| 2014/0380487 A1 | 12/2014 | Stella et al. | |
| 2015/0067323 A1 | 3/2015 | Salowey et al. | |
| 2015/0106620 A1 | 4/2015 | Cabrera et al. | |
| 2015/0213270 A1 | 7/2015 | Stella et al. | |
| 2015/0213271 A1 | 7/2015 | Stella et al. | |
| 2015/0381580 A1 | 12/2015 | Graham, III et al. | |
| 2016/0142427 A1 | 5/2016 | de los Reyes et al. | |
| 2018/0019985 A1 | 1/2018 | Schoof et al. | |
| 2018/0020008 A1 | 1/2018 | Schoof et al. | |
| 2018/0034847 A1 | 2/2018 | Stella et al. | |

FOREIGN PATENT DOCUMENTS

| | | |
|---|---|---|
| WO | WO-02/023867 | 3/2002 |
| WO | WO-2008/087640 | 7/2008 |
| WO | WO 2014/088541 | 6/2014 |

OTHER PUBLICATIONS

Stella et al., Notice of Allowance, dated May 23, 2014, directed to U.S. Appl. No. 13/969,158; 20 pages.
Stella et al., U.S. Office Action dated Nov. 3, 2014, directed to U.S. Appl. No. 14/467,933; 14 pages.
Stella et al., U.S. Office Action dated Jul. 31, 2015, directed to U.S. Appl. No. 14/679,831; 13 pages.
Stella et al., U.S. Office Action dated Feb. 9, 2016, directed to U.S. Appl. No. 14/679,831; 12 pages.
Stella et al., U.S. Office Action dated Jan. 2, 2014, directed to U.S. Appl. No. 13/969,181; 17 pages.

(56) References Cited

OTHER PUBLICATIONS

Stella et al., U.S. Office Action dated May 9, 2014, directed to U.S. Appl. No. 13/969,181; 19 pages.
Stella et al., U.S. Notice of Allowance dated Feb. 3, 2015, directed to U.S. Appl. No. 13/969,181; 10 pages.
Stella et al., U.S. Office Action dated Sep. 15, 2015, directed to U.S. Appl. No. 14/679,811; 17 pages.
Stella et al., U.S. Office Action dated Nov. 27, 2013, directed to U.S. Appl. No. 13/969,216; 21 pages.
Stella et al., Notice of Allowance, dated Mar. 18, 2014, directed to U.S. Appl. No. 13/969,216; 17 pages.
Stella et al., Notice of Allowability, dated May 21, 2014, directed to U.S. Appl. No. 13/969,216; 9 pages.
Stella et al., U.S. Office Action dated Oct. 30, 2014, directed to U.S. Appl. No. 14/305,500; 22 pages.
Stella et al., U.S. Notice of Allowance dated Feb. 23, 2015, directed to U.S. Appl. No. 14/305,500; 9 pages.
Stella et al., U.S. Office Action dated Jul. 9, 2015, directed to U.S. Appl. No. 14/691,436; 23 pages.
Stella et al., U.S. Office Action dated Mar. 2, 2016, directed to U.S. Appl. No. 14/691,436; 23 pages.
Stella et al., U.S. Office Action dated Sep. 22, 2016, directed to U.S. Appl. No. 14/691,436; 20 pages.
Stella et al., U.S. Office Action dated May 2, 2017, directed to U.S. Appl. No. 14/691,436; 16 pages.
Stella, J. et al., U.S. Office Action dated Oct. 9, 2014, directed to U.S. Appl. No. 14/302,220; 20 pages.
Stella, J. et al., U.S. Office Action dated Feb. 23, 2015, directed to U.S. Appl. No. 14/302,220; 22 pages.
International Search Report and Written Opinion dated Apr. 28, 2014, directed to International Application No. PCT/US2013/055449; 25 pages.
International Search Report and Written Opinion dated Aug. 25, 2015, directed to International Application No. PCT/US2015/034109; 20 pages.
Invitation to Pay Additional fees dated Sep. 11, 2017, directed to International Application No. PCT/US2017/042654; 2 pages.
International Search Report and Written Opinion dated Nov. 17, 2017, directed to International Application No. PCT/US2017/042654; 14 pages.
International Search Report and Written Opinion dated Oct. 10, 2017, directed to International Application No. PCT/US2017/042665; 10 pages.
International Search Report and Written Opinion dated Sep. 27, 2017, directed to International Application No. PCT/US2017/044199; 15 pages.
Office Action dated Nov. 25, 2016, directed to CN Application No. 201380049976.1; 7 pages.
Partial Supplementary Search Report dated Mar. 3, 2016, directed to EP Application No. 13831764.9; 9 pages.
Extended Search Report and Written Opinion dated Jul. 8, 2016, directed to EP Application No. 13831764.9; 13 pages.
Extended Search Report dated Oct. 9, 2017, directed to EP Application No. 15806113.5; 13 pages.
Office Action dated Oct. 27, 2017, directed to JP Application No. 2015-527673; 14 pages.
(2012) "Cybersecurity Startup Luminal Gets $3.82M in Series A Funding," located at PrivateEquity.com. 1 page.
Microsoft "Windows Update Explained: How the Software Update Service Works and Why it Matters to You," Published Sep. 2008; 12 pages.
McLellan, Lizzy, (Apr. 23, 2014) "Cybersecurity's new frontier: Frederick-based Luminal developing new security software," The Daily Record (Baltimore, MD); 2 pages.
Summary of Luminal.com, located at <https://web.archive.org/web/20140401000000*/http://luminal.com> visited on Sep. 25, 2014. 3 pages.
Parelkar et al., "Authenticated Encryption in Hardware," A Thesis Submitted to the Graduate Faculty of George Mason University, 2005, pp. 1-128.
Tanenbaum et al., (Dec. 1981) "Network Protocols," *Computing Surveys* 13(4): 453-489.
U.S. Appl. No. 62/363,803, filed Jul. 18, 2016; 56 pages.
International Search Report and Written Opinion dated Dec. 8, 2016, directed to International Application No. PCT/US2016/055372; 9 pages.

* cited by examiner

SYSTEM AND METHOD FOR BUILDING, OPTIMIZING, AND ENFORCING INFRASTRUCTURE ON A CLOUD BASED COMPUTING ENVIRONMENT

CROSS-REFERENCE TO RELATED APPLICATION

This application claims priority to U.S. Provisional Patent Application No. 62/237,432, filed Oct. 5, 2015, which is incorporated herein by reference in its entirety.

FIELD OF THE INVENTION

This disclosure relates generally to cloud based computing environments in which a user is able to specify a desired infrastructure using a programming language configured to interface with an cloud environment operating system (OS). The computing environments can be configured to simultaneously support multiple users, wherein each user being able to operate against one or more cloud based environments. Once the computing infrastructure has been specified, the cloud environment operating system can build the desired infrastructure in the specified cloud service, optimize the infrastructure based on conditions encountered in the cloud computing environment, and enforce desired infrastructure specifications in real-time.

BACKGROUND OF THE INVENTION

Cloud computing allows individuals, businesses, and other organizations to implement and run large and complex computing environments without having to invest in the physical hardware (such as a server or local computer) necessary to maintain such environments. Rather than having to keep and maintain physical machines that perform the tasks associated with the desired computing environment, an end-user can instead "outsource" the computing to a computing "cloud" that can implement the desired computing environment in a remote location. The cloud can consist of a network of remote servers hosted on the internet that are shared by numerous end-users to implement each of their desired computing needs. Simplifying the process to build, optimize, and maintain computing environments on the cloud can lead to a positive end-user experience. Allowing a user to develop a robust computing infrastructure on the cloud, while seamlessly optimizing and maintain it, can minimize frustrations associated with corrupted infrastructure that can occur during the course of operating a computing environment on the cloud.

SUMMARY OF THE INVENTION

This disclosure relates to a cloud environment operating system that accepts a user-defined computing environment infrastructure specification, produces and optimizes the software modules necessary to build the infrastructure, and continuously works to maintain the infrastructure according to the user's specification during operation of the computing environment on the cloud. By continuously maintaining the specified infrastructure during operation, the cloud environment operating system can minimize infrastructure corruption that can occur over time.

DETAILED DESCRIPTION OF THE INVENTION

Figure 1:
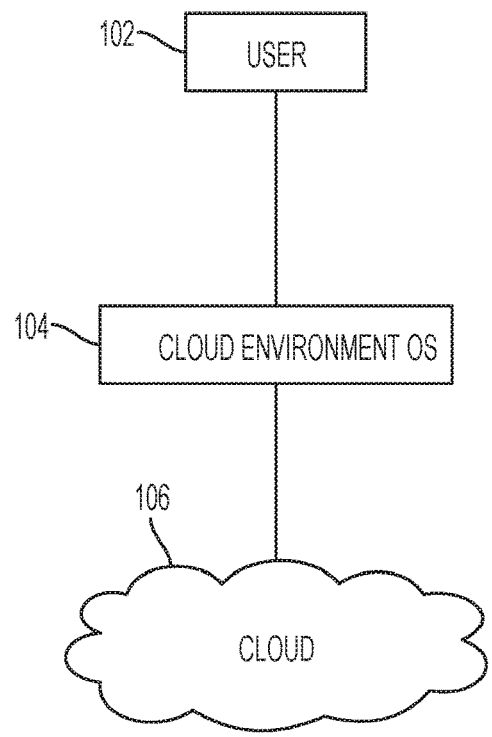
FIG. 1 illustrates an exemplary cloud computing environment according to examples of the disclosure.

A cloud computing system ("cloud") is a large distributed computer that is shared by multiple clients and is used to virtualize computing environments thereby liberating end-users from the burdens of having to build and maintain physical information technology infrastructure at a local site. FIG. 1 illustrates an exemplary cloud computing environment according to examples of the disclosure. The cloud computing environment depicted in FIG. 1 begins with a user 102 who wishes to implement a computing environment on a cloud 106. Examples of users 100 can include individuals, businesses, or other organizations that wish to utilize the distributed computer provided by the cloud to implement a computing environment such as a web server, a computer network, a computer database operation, etc.

The cloud 106, as previously discussed, is one or more distributed generalized computers that provide the computing resources to a user to allow them to implement their desired computing environment. Commercial cloud computing services such as Amazon™ web services, Microsoft Azure™, Google Cloud Platform™, are examples of distributed computer networks (clouds) available to users (for a fee) that allow them to build and host applications and websites, store and analyze data, among other uses. Clouds are scalable, meaning that the computing resources of the cloud can be increased or decreased based on the real-time needs of a particular user. In one example, a cloud 104 can be utilized to implement a website run by a user 102. The cloud 106 can maintain and operate a web-server based on the specifications defined by the user 102. As web-traffic to the website increases, the cloud can increase the computing resources dedicated to the website to match the surge in traffic. When web traffic is sparse, the cloud 106 can decrease the computing resources dedicated to the website to match the decrease in traffic. Cloud service providers can implement computing environments in "user accounts," maintained and operated by the cloud service provider. Thus the computing environment of a first user can be implemented in a first user account, while the computing environment of a second user can be implemented in a second account. In some embodiments, a single user can maintain separate accounts for separate computing environments that they wish to implement and maintain. A Cloud Service Provider offers the infrastructure services that allow users to implement infrastructure "environments" in their CSP user accounts through those infrastructure services. For example, the VPC AWS Service allows one to create, modify, and delete a VPC.

An cloud environment operating system (OS) 104 can help to facilitate the interaction between a user 102 and a cloud computing environment 106. A conventional operating system manages the resources and services of a single computer. In contrast, an cloud environment operating system manages the resources and services of a cloud.

An cloud environment operating system can automate the creation and operation of one or more cloud infrastructures and can create and destroy computing instances on one or more cloud service providers. While the example of FIG. 1 illustrates the cloud environment operating system as a stand-alone entity, the example should not be considered limiting. The cloud environment operating system can be run on a client device, one a server such as a third party server, or located on a cloud service provider system that runs and executes the computing environment. The cloud environment operating system operates separately and interfaces with the cloud computing environment including any command line interfaces or operating systems used by the cloud to build and maintain the computing infrastructure.

Figure 2:
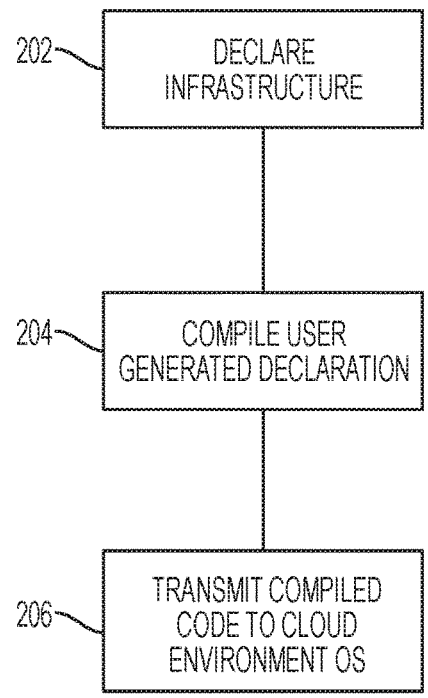
FIG. 2 illustrates an exemplary user cloud based computing environment design process according to examples of the disclosure.

An cloud environment operating system 104 can interface with a user 102 by allowing the user to specify a desired computing infrastructure in a simplified and concise manner. In one example, a user 102 can specify a computing environment using a programming language designed to interface with the cloud environment operating system 104. FIG. 2 illustrates an exemplary user cloud based computing environment design process according to examples of the disclosure. The example of FIG. 2 utilizes a programming language that once compiled can be inputted into the cloud environment operating system 104 for further processing.

At step 202 a user can provide a declaration of the infrastructure to be built on the cloud service provider. As an example, the user, using a pre-defined programming language, can specify the components within the infrastructure, the specifications of each component, and the types of communication that each component within the infrastructure has with each other.

In one example, at step 202, a user can provide a declaration of the infrastructure to be built on the cloud service provider utilizing a domain-specific programming language configured to allow a user to express infrastructure elements and relationships concisely in a text-based format. In additional examples, the domain-specific language can allow for comments to be expressed in-line with other content, thus allowing for the understanding and maintenance of content over time. Additionally, the domain specific-language can include pre-defined concepts (i.e., service types) that can enable the user of the cloud environment operating system to reference or use the concepts without having to define them themselves. Additionally, the domain specific language can allow for a user to define their own types, functions, and modules if desired. In some examples, the domain-specific language can include pre-defined libraries that can encompass definitions of cloud infrastructure elements, which can allow for code reuse, and thus reduce overall development effort. Finally, in one or more of the examples described above, the domain-specific language described above can be run through a compile, so as to identify problems in the user's specification of the cloud computing environment. This can lead to shorter feedback cycles, that can potentially be reduce costs by ascertaining problems with a cloud computing environment specification before consuming or instantiating a cloud-based service to develop computing infrastructure.

Figure 3:
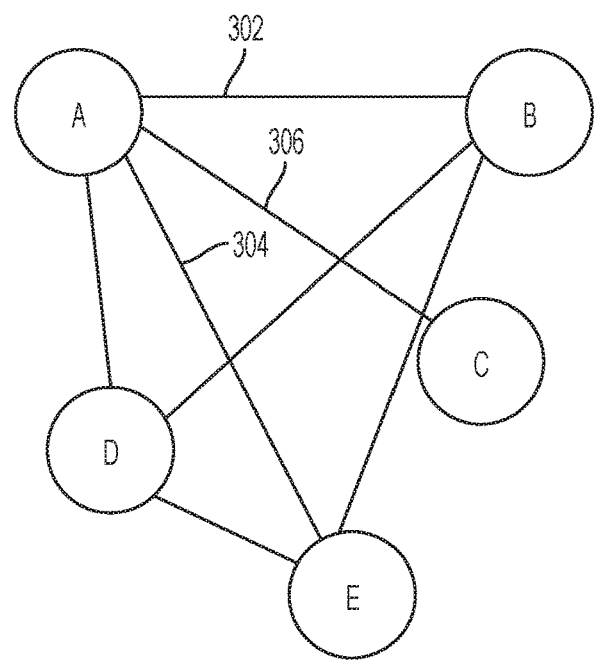
FIG. 3 illustrates an exemplary computing environment infrastructure according to examples of the disclosure.

FIG. 3 illustrates an exemplary computing environment infrastructure according to examples of the disclosure. As illustrated in FIG. 3, each component of the computer infrastructure (labeled A-E) can be communicatively couple to other components that are part of the infrastructure. In one example component A could be a load balancer, component B could be a server, and component E a database. Components A, B, and E can be communicatively coupled to each other via one or more communication paths labeled 302, 304, and 306.

Referring back to FIG. 2, at step 202 a user can define each and every component of the computer infrastructure. In the example discussed above with respect to FIG. 3, a user can define the load balancer A, the server B, and the database E using the syntax of the programming language. The user 102 can provide specifications for each and every component of the infrastructure and can provide information about which components can communicate with one another (i.e., paths 302, 304, and 306) and also what type of communication will occur between the components.

At step 204, the user's declarations generated at step 202 can be compiled. The compiler can include multiple libraries that provide meaning to the declarations that the user generated at step 202. For instance the libraries can include information about the cloud environment operating system-cloud environment operating system that is to be accessed, the cloud service on which the infrastructure is to be build (i.e., Google, Amazon, Microsoft) and information about the different components that can be created using the programming language.

Finally, at step 206, the compiled program code can be sent to the cloud environment operating system 104 for further processing. In some examples, the code compiled at step 204 and transmitted at step 206 is not a complete program ready to be executed by the cloud 106, but rather can be a code that contains numerous omissions to be later filled in by the cloud environment operating system 104. These "omissions" can be later be parsed by the cloud environment operating system and resolved based on the cloud service provider that is to be used in implementing the computing infrastructure. The compiled program code generated at step 204 can contain a terse, machine-friendly, but less user-friendly syntax. In this way, the programming language used in the example of FIG. 2 can allow a user to specify their infrastructure in a convenient easy-to-use syntax, but that syntax can then be converted into a machine-friendly syntax that can be parsed and used by a cloud environment operating system.

The syntax used by the programming language can be generic. In other words the syntax does not have to be tailored to work with any particular cloud service provider such as Amazon, Google, etc. Instead, a user can specify generic infrastructure and the cloud environment operating system as further discussed below can implement the generic declaration into a series of instructions that are understood by the cloud service provider being utilized. In some embodiments, the cloud environment operating system can determine which cloud service provider to implement the infrastructure on based on the specification of the infrastructure provided by the user. Referring back to FIG. 3, a user can specify a communication path between component A and component C; however that declaration does not have to take into account the cloud service that is to be ultimately utilized. Instead, the cloud environment operating system can translate the declaration of a communication path between component A and component C into a set of instructions that is to be understood by the utilized cloud service provider.

A user can also declare the infrastructure in a syntax that is germane to the cloud service provider that is ultimately be utilized. For instance, if a user knows that they want to utilize Microsoft's Azure platform, the user can generate declarations of the communication path between A and C in a syntax that is specific to the Azure cloud platform.

In addition to creating infrastructure for a cloud, the user can also save previously created infrastructures as libraries within the coding platform. In one example, if a user in the past created a database server infrastructure, they can save that infrastructure as a library. Then in the future, if the user wishes to create a computing environment that utilizes a database server, rather than create a new database server, the user can simply call upon the library in which the database server infrastructure is already stored and utilize it in the computing environment that is currently being created. In this way, the user can define re-usable infrastructure that can be applied to the creation of future infrastructure on a cloud based computing platform.

Figure 4:
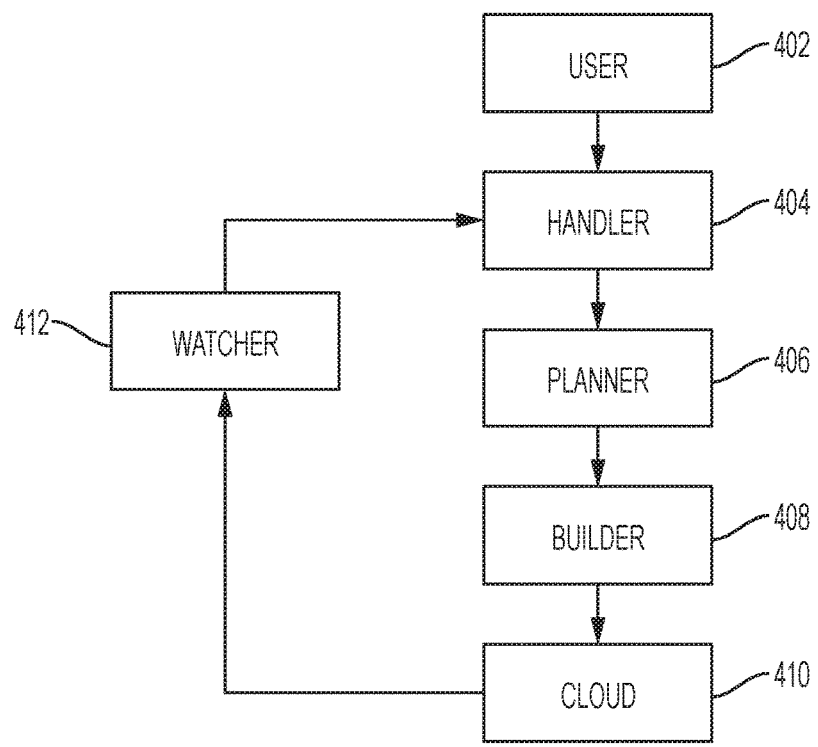
FIG. 4 illustrates an exemplary cloud environment operating system process according to examples of the disclosure.

FIG. 4 illustrates an exemplary cloud environment operating system process according to examples of the disclosure. At step 402, a user can create a composition that describes the computing infrastructure that they want to build in the cloud. As discussed above, the composition can be written in the form of a declaration which is written in a domain specific programming language. Also as discussed above, once the user writes the composition, it can be translated into a hardware-friendly language that is compatible with the cloud environment operating system that will process the composition to generate the desired infrastructure.

At step 404 the composition generated by the user can be sent to a handler. The handler can capture and version the composition and determine if the composition drafted by the user is a new build (i.e., generating a new computer infrastructure from scratch) or an update to a previously existing infrastructure already running on the cloud. Once the handler receives the composition and makes the determinations described above, it can then trigger the build process by sending the composition to a planning stage.

At step 406, the composition can be passed from the handler stage to planner stage wherein the composition generated by the user is run through a series of modules (described in further detail below) that convert it into a series of instructions to be sent to a builder that will ultimately build the infrastructure in the cloud. The planner stage in addition to interpreting the language of the composition can also perform operations on the composition to determine whether or not there are any errors or structural faults with the composition as written by the user.

The planner 406 can transmit the instructions created from the composition to a builder. The builder at step 408 can take the instructions and build, update, or destroy the infrastructure specified by the user in the specified cloud.

At step 410, the cloud can run the infrastructure specified by the builder in step 408. As the cloud is running the specified infrastructure, should any errors occur in the operation of the infrastructure, the cloud can notify a watcher algorithm at step 412 which can then trigger a rebuild at the handler step 404 of the components of the infrastructure that have generated the error.

Figure 5:
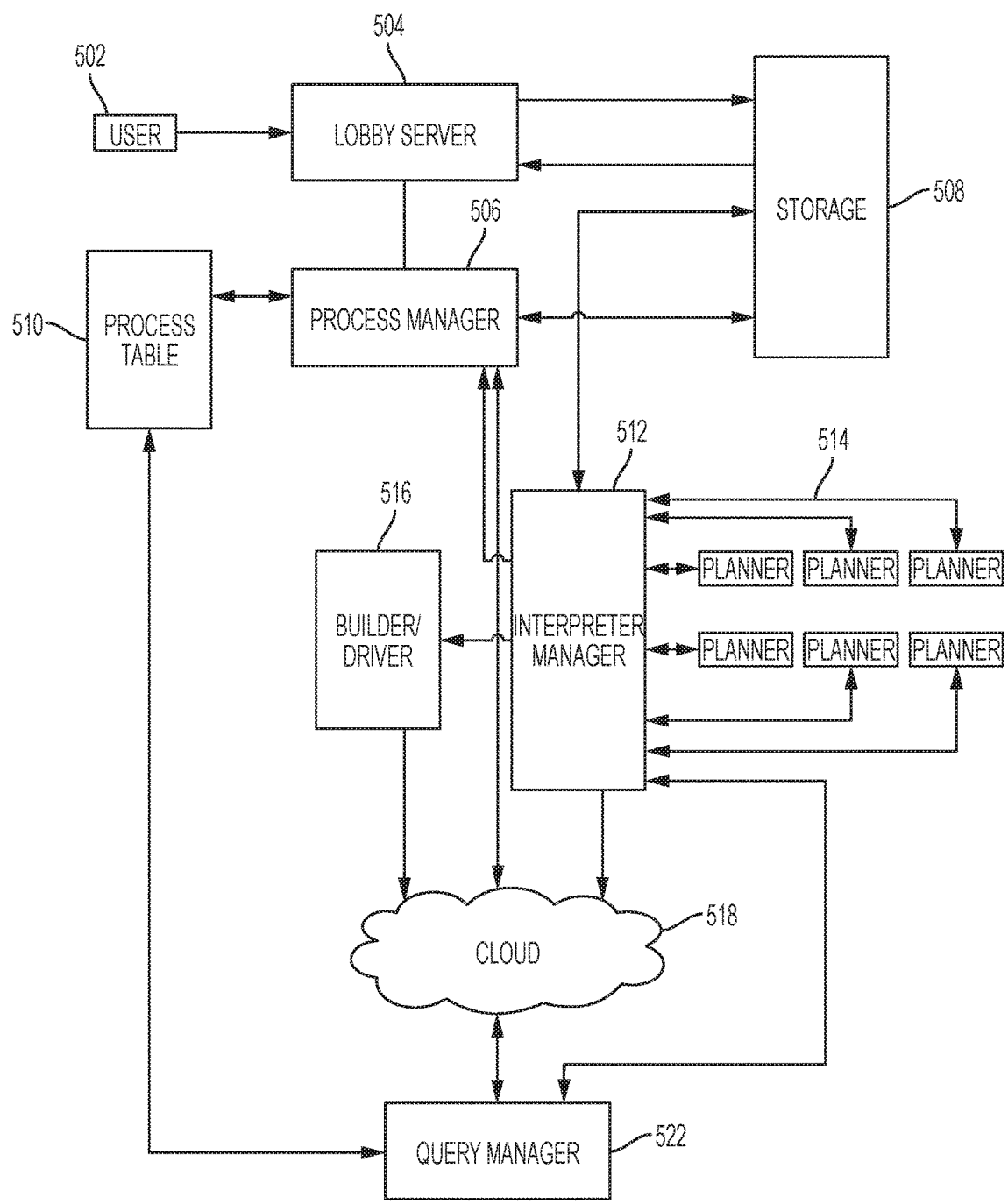
FIG. 5 illustrates an exemplary cloud environment operating system functional block diagram according to examples of the disclosure.

FIG. 5 illustrates an exemplary cloud environment operating system functional block diagram according to examples of the disclosure. The functional block diagram illustrated in FIG. 5 can, in some examples, implement the process described in FIG. 4.

Block 502 can represent the user process that occurs before operation of the cloud environment operating system as described above with respect to FIGS. 1-3. As previously discussed, the user can declare an infrastructure using user-friendly syntax which can then be converted to a lower level language that can be interpreted by the cloud environment operating system to build a desired infrastructure on the cloud. User 502 can represent one user, or in some examples can represent multiple users, each of which has specified a desired computing infrastructure to be implemented on a cloud, or multiple clouds.

Block 504 can represent a lobby server. Lobby server 504 can receive low level code (otherwise known as a command line interface) from one or more users and performs a "pitch and catch process" that receives code from one or more users and unpacks it (i.e., distill the parts of the code that will interface with the cloud environment operating system) and stores any data (at storage unit 508) that is needed to compile the code and routes the information that comes from the user to the appropriate modules within the cloud environment operating system. In addition, the lobby server 504 can identify all of the processes associated with a particular user's command line interface and apply process "tags" to those processes. The process tags can allow the cloud environment operating system to track where in the system the processes are currently being executed. This feature can allow for simplicity in scheduling management as will be discussed further below.

The lobby server 504 can also handle external data requests. If a request is made to the cloud environment operating system for certain forms of data about the run-time environment of the cloud environment operating system, the lobby server 504 is able to receive the request, execute it, and send the acquired data to the appropriate stake holder.

Once the code received from the user has been processed by the lobby server 504, the processed code can then be sent to process manager 506. The process manager 506 can manage a process table 510 which lists each and every process to be run by the cloud environment operating system. In other words, one set of instructions to build a particular infrastructure by a particular user can be handled as a process. Another set of instructions to build infrastructure by another user can be handled as a separate process. The process manager 506 can manage each separate user's tasks as a processes within the system by assigning it a process ID and tracking the process ID through the system. Each user's individual tasks to be executed by the cloud environment operating system can be managed as separate entities. In this way, the process manager 506 can enable the cloud environment operating system to operate as a "multi-tenant" system as opposed to a single-user system. In other words, multiple users can implement multiple computing environments via single instance of a cloud environment operating system. The cloud environment operating system can handle requests for infrastructure from multiple users simultaneously rather than being dedicated to a single user or single machine.

In addition to the functions described above, the process manager 506 can also perform status checks on the implementation of the infrastructure in the cloud. In pre-determined time intervals, the process manager 506 can initiate a process whereby a signal is sent to the query manager 522 to determine the status of the infrastructure in the cloud. The query manager 522 can determine the status of the user's infrastructure and send commands to the interpreter manager 512 to take action (described further below) if it is determined from the query manager that the user's infrastructure specification does not match infrastructure present on the cloud.

Once the process manger identifies the process to be executed on the cloud environment operating system and stores the processes on process table 510, it can then send those processes to the Interpreter Manager 512 to be converted into a set of instructions that can ultimately be executed by the cloud.

The interpreter manager 512 can be responsible for converting the user's command line interface language (i.e., high level declaration) into a series of specific instructions that can be executed by the cloud environment operating system. The interpreter manager 512 can achieve this by employing a series of planning modules 514 that accept, in some examples, resource tables at its input and generates resource tables in which any omissions in the syntax provided by the user are filled in. The interpreter manager 512 can review a resource table sent by the user and send it to the series of planning modules 514 based on what infrastructure needs have been declared by the user. The planning modules 514 alter the user's resource table and return it to the interpreter manager 512. This process may be repeated with other planning modules until the final correct version of the resource table is complete. The interpreter manager 512 then converts the resource table into a machine instruction file which can be referred to as a low level declaration of the computer infrastructure to be built on the cloud. The low level declaration is then sent to the builder/driver 516 (discussed in detail below).

Figure 6:
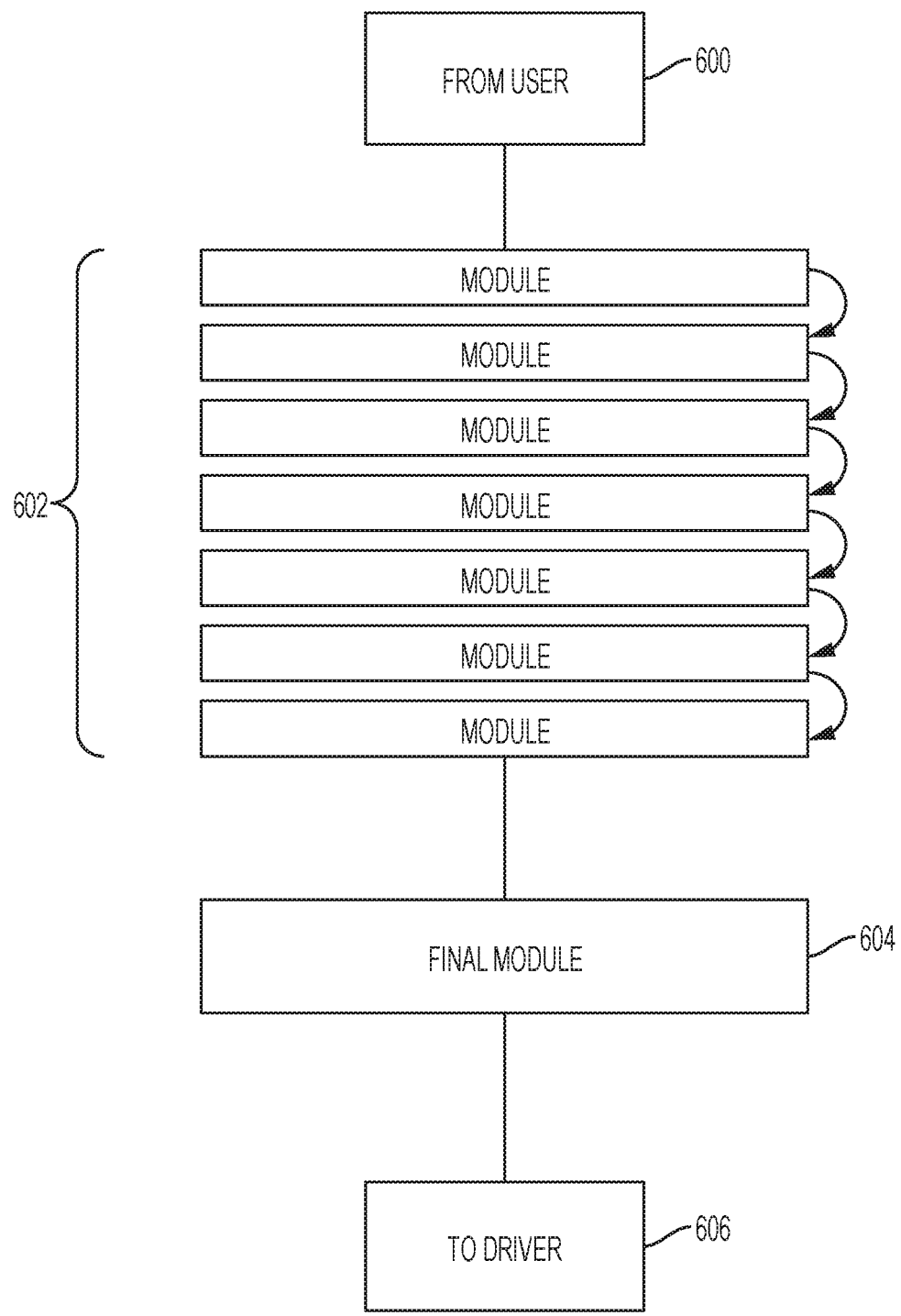
FIG. 6 illustrates an exemplary planning module process according to examples of the disclosure.

FIG. 6 illustrates an exemplary planning module process according to examples of the disclosure. As previously discussed with respect to FIG. 5, interpreter manager 512 can include multiple planning modules 602. Each planning module 602 can be responsible for handling specific types as defined in the programming syntax used by the user to specify their desired infrastructure. As an example, if a user specifies that they want a load balancer as part of their infrastructure, a specific planning module within the interpreter manager 512 can be assigned responsibility for handing load balancer types and can convert the specification of a load balancer by the user into instructions to be implemented on a cloud.

Each planning module 602 can accept at its input the code received by the user 600 expressed a resource table, and can return a resource table that is more specific and complete filling in any omissions in the resource table that were present when it was inputted. In one example, the code from the user is input into a first planning module 602 that returns a resource table that is then inputted into a second module. The output of the second module is then inputted into a third module, etc., etc.

The use of modules to convert a user's command line interface language into instructions for a cloud can also allow for ease in defining new types of infrastructure previously not available on the cloud environment operating system. In one example, if a load balancer was not an infrastructure type supported by the cloud environment operating system, a user could simply create a library in the programming language on the user side that supports the declaration of a load balancer. In order for the cloud environment operating system to support the "new" load balancer, a new module could be created that provides the logic for handling load balancer infrastructure types. In this way, the modular nature of the interpreter manager 512 allows for ease in adding new infrastructure types.

Returning to FIG. 6, the multiple modules 602 can, in one example, be arranged in a pipeline/stacked configuration. When code is sent by a user 600 as previously discussed, the interpreter manager 512 can process the code by running through each module individually. In other words, the code can be passed from module to module until it has passed through each and every module of the interpreter manager 512.

The order in which the code is processed through the modules 602 can vary. For instance in one example, the code can be processed sequentially through each module in a pre-defined order. In another example, the code can be processed in an order that depends on dependencies between the modules 602. For instance, one module may depend on the result of another module before it can process the code. In this instance, the module that is dependent on the result of another module can wait until completion of the module it is dependent on to finish before beginning its' processing.

After the code provided by the user is processed through the modules 602, it can finally be sent to a final module 604 for final processing. Final module 604 can be responsible for finalizing the resource table to be prepared for conversion into a series of instructions that can be understood by the cloud. Ultimately the pipeline of modules 602 and 604 create a low level code that is free from the abstractions and omissions previously present at the higher level language provided by the user. Finally, module 604 can also determine whether all of the abstractions and omissions have been resolved by the modules 602. If it is determined that not all omissions and abstractions have been resolved, final module 604 can run the resource tables back through the modules and repeat the process until each and every resource table has been completed.

In addition to a language interpretation function, in which the modules 602 interpret language from a user into a lower level language to be executed by the cloud, each module can also perform one or more run-time operations. As an example, the modules can run a de-bugging operation. When a high level declaration is received from a user, a dry run through the modules can be performed in which the code is run through module-by-module to ensure that there are no errors in the code such as those caused by typos or other operator error. If an error is found, the interpreter manager 512 can notify the user of the error.

In contrast, a cloud environment operating system without this capability would instead parse the code from the user and pass a series of instructions to the cloud. Once the cloud begins to implement the series of instructions, it may then encounter an error and ultimately not generate the desired infrastructure. The user may not become aware of the error until much later in the process which can waste time and resources. Instead the cloud environment operating system, through the interpreter manager 512, can detect these errors earlier in the process chain such that they can be corrected further upstream in the process.

Another example of a run-time operation performed by the modules is that each module is able to communicate to resources external to the cloud environment operating system in order to resolve omissions and abstractions from the user's code. For instance in one example, if the user level code requires the most update-to-date version of a component of the infrastructure, the modules 602 can communicate with an external configuration management system to provide that up-to-date component.

The planning modules 514 discussed above can adjust a user's infrastructure in response to conditions of the infrastructure after it has already been implemented on the cloud. As discussed above, process manager 506, after a pre-defined time period, can query the status of the infrastructure via a query manager 522. The status of the infrastructure can then be sent by the process manager to interpreter manager 512. Interpreter manager 512, via the planning modules 514, can compare the specification of the infrastructure as specified by the user with the current status of the infrastructure. If a difference is found between the specification of the infrastructure by the user and its current state on the cloud, the planning modules 514 can generate code to correct the infrastructure on the cloud so that it conforms to what the user specified.

Figure 7:
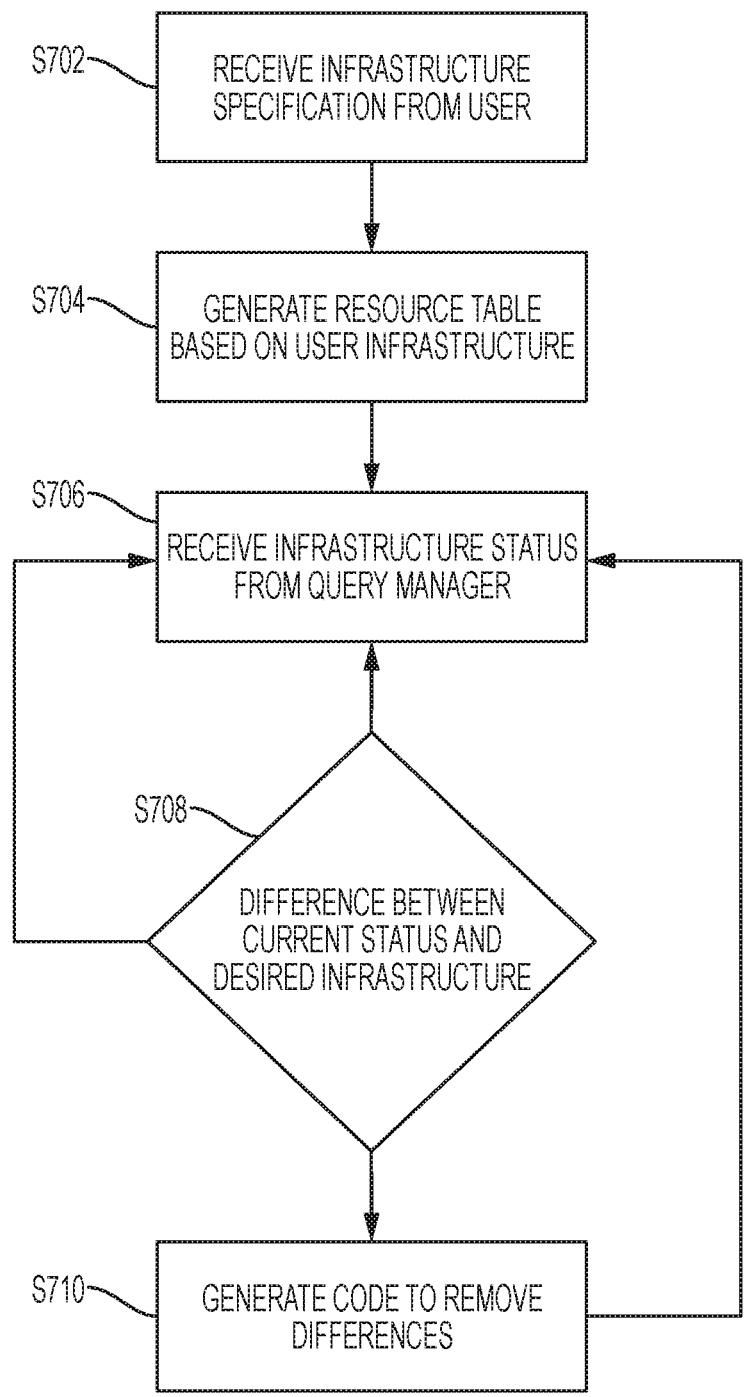
FIG. 7 illustrates an exemplary infrastructure maintenance process according to examples of the disclosure.

FIG. 7 illustrates an exemplary infrastructure maintenance process according to examples of the disclosure. The process outlined in FIG. 7 can be, in some examples, implemented in the interpreter manager 512 that utilizes the planning modules 514. At step S702 the interpreter manger 512 can receive a declaration of infrastructure from a user as discussed above.

At step S704 the interpreter manager 512 can generate a completed resource table based on the specified infrastructure to be built by the user. As will be discussed further below, the completed resource table can be sent to a Builder/Driver 516 to be converted into a series of instructions that will be executed by the cloud.

At step S706, the interpreter builder 512 can receive a status of the infrastructure already built from query manager 522. As discussed above, query manager 522 can be prompted by the process manager 506 in pre-determined time intervals to return a status of the infrastructure.

At step S708 the interpreter manager 512 can compare the current status of the infrastructure on the cloud as provided by the query manager 522 with the declaration of the infrastructure provided by the user at S702. If there are no differences between the declared infrastructure and the current status of the infrastructure, the process can return to step S706 to await the next status update from the query manager 522.

If however, there is a difference between the current status of the infrastructure, the planning modules 514 of interpreter manager 512 can be employed to generate resource table updates that can be passed to the cloud via builder/driver 516 so as to ensure that the infrastructure on the cloud is conformed to the original declaration of the infrastructure by the user.

Once the infrastructure on the cloud has been modified according the user's declaration, the process can return to the step S706 to await the next status update from the query manager 522.

In this way, not only does the cloud environment operating system build a desired infrastructure on a cloud, it also continually checks the infrastructure to ensure that there has not been any configuration drift or corruption over time that would bring the infrastructure out of specification with what the user initially declared the structure to be. This feature can provide an improvement over conventional cloud operation systems that implement a user's infrastructure but do not monitor that infrastructure for configuration drift or corruption over time.

Returning to FIG. 5, once the interpreter manager 512 completes its processes as described above, it can send a completed resource table to builder/driver 516. Builder/driver 516 can convert the completed resource table into a series of instructions that can be executed by the cloud. The builder/driver 516 can interface with the application program interface (API) of the cloud 518 to generate the desired infrastructure, or the desired modifications of the infrastructure as described above.

In another example, lobby server 504, process manager 506, storage 508, process table 510, interpreter manager 512, planner modules 514, builder driver 516, and query manager 522 can be implemented within a cloud computing environment in which case, rather than interfacing with a cloud 518, the system interfaces with a computing environment located within the cloud or another cloud service provider external to the cloud computing environment in which the above mentioned components reside (see further discussion below). In some embodiments, a cloud computing environment can include a separate account created in a cloud service provider by the cloud computing environment to implement a user-specified computing environment.

In addition to monitoring the implementation of the declared infrastructure on the cloud, the system described in FIG. 5 can also conduct policy checking functionality. As an example, if the cloud service has specific policies with regard to such things as network security, communication protocols, etc., and the user's declared infrastructure violates any of the policies of the cloud, the user can be notified of such violation prior to any infrastructure being built on the cloud.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Figure 8:
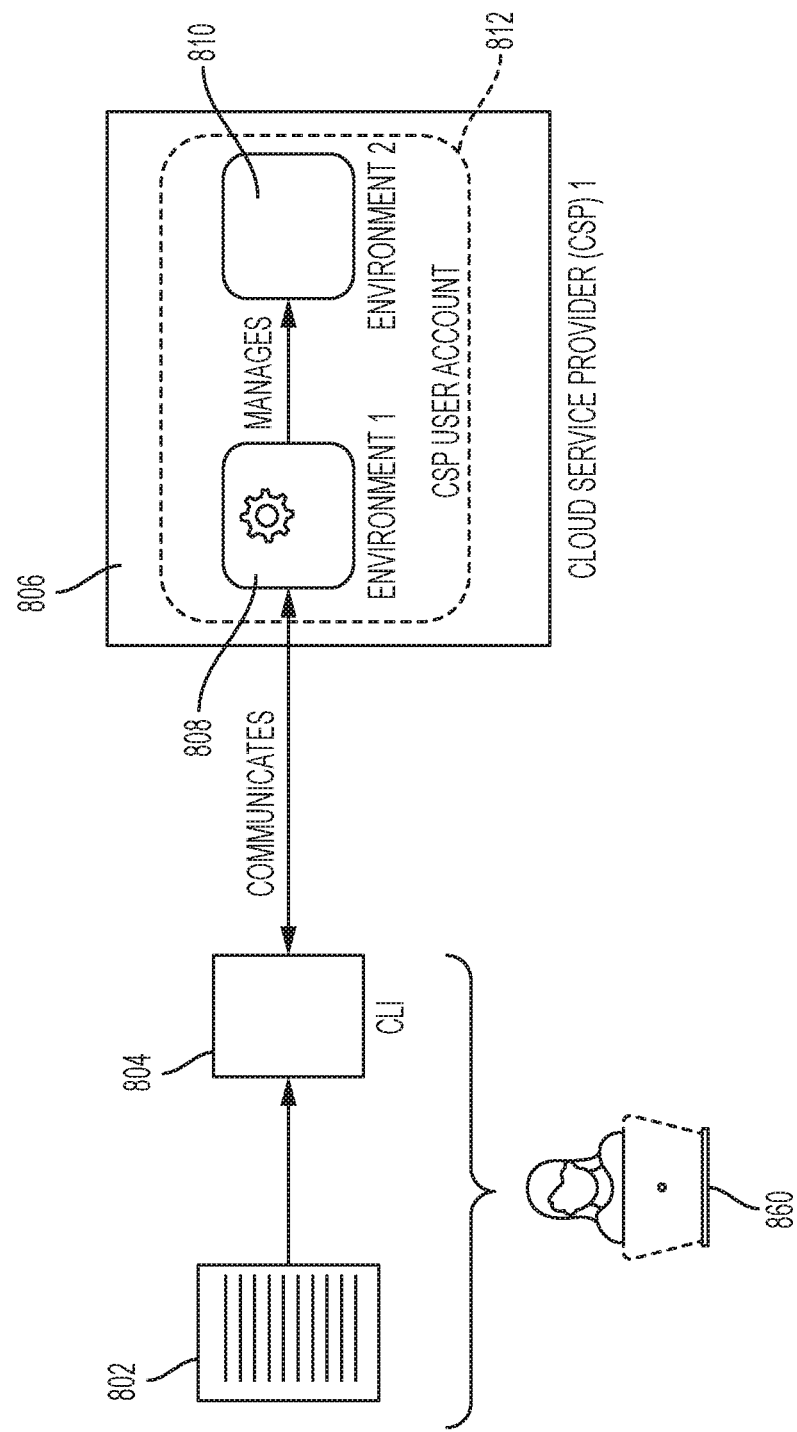
FIG. 8 illustrates an exemplary user interaction with a cloud environment operating system according to examples of the disclosure.

As discussed above, in some examples, the cloud environment operating system can be implemented within a cloud service provider environment. FIG. 8 illustrates an exemplary user interaction with a cloud environment operating system according to examples of the disclosure. In the example of FIG. 8, a user 860 can interact with a cloud environment operating system 808 through the use of a compiled domain specific language file created by the user that is configured to interface with a command line interface 804. The compiled domain specific language file 802 can provide one or more commands to be processed by the command line interface 804 that issues one or more commands to the operating system 808.

As previously discussed, the cloud environment operating system 808, can refer to the components described above that can be used to automate the creation and operation of one or more cloud computing infrastructures and can create and destroy computing instances on one or more cloud service providers based on a user provided specification of computing infrastructure. Also as previously discussed, the cloud environment operating system 808 can be deployed within a cloud service provider.

As an example, in FIG. 8 cloud environment operating system 808 can be deployed with cloud service provider 806. Specifically, cloud environment operating system can be deployed within a specific cloud service provider user account 812, through which the user, accessing his or her account can use the cloud environment operating system 808 to build and maintain their cloud-based computing environments. In one example, the cloud environment operating system components can be maintained in a specified cloud computing environment within the user account 812. In the example of FIG. 8, the cloud environment operating system, having received a specification of a cloud computing environment from the user 860, could build and manage a cloud computing environment 810 within the user's cloud service provider account 812.

Figure 9:
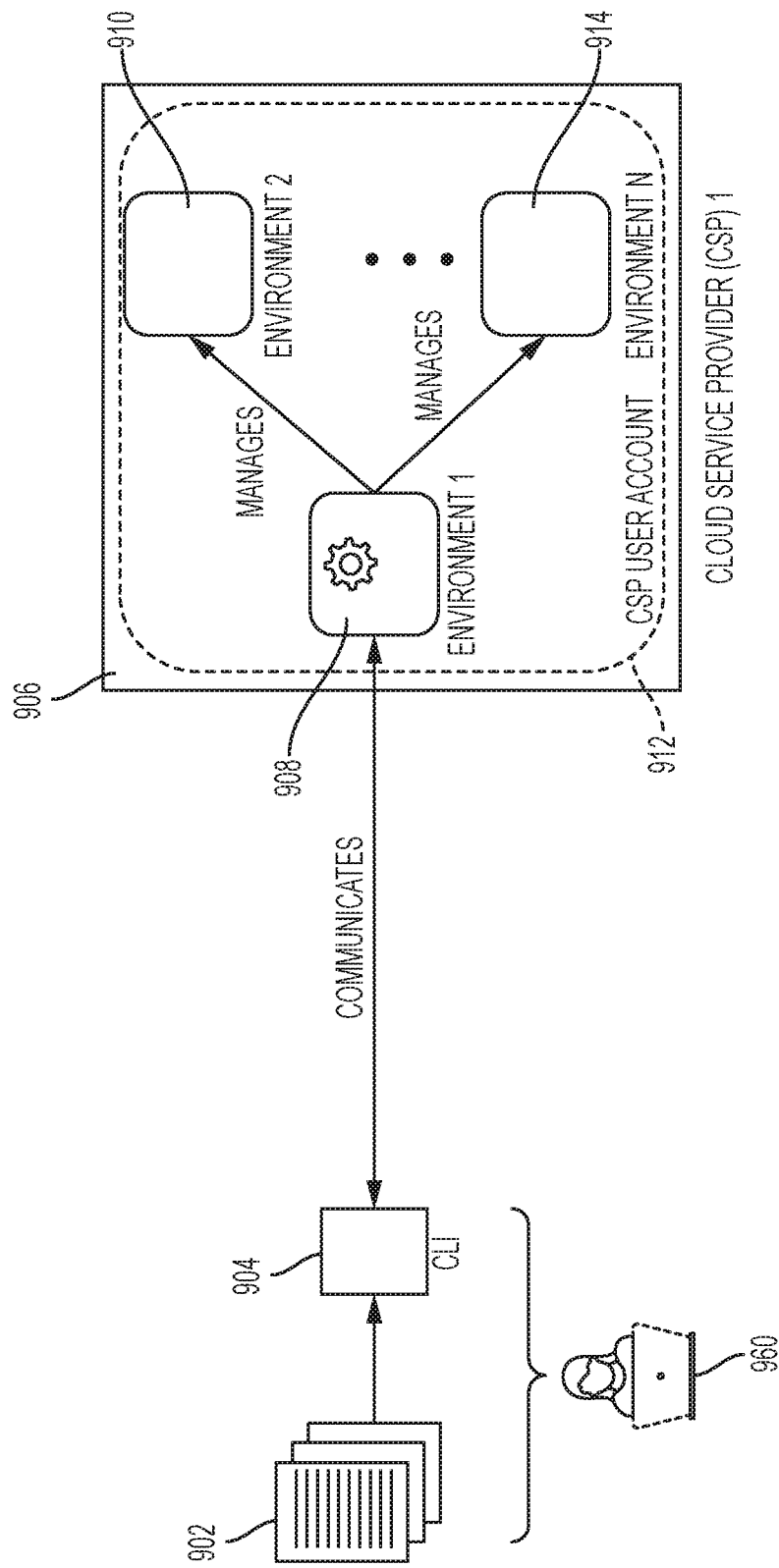
FIG. 9 illustrates another exemplary user interaction with a cloud environment operating system according to examples of the disclosure.

In another example, a single user can use a single deployment of the cloud environment operating system on their cloud service provider account to manage multiple cloud computing environments. FIG. 9 illustrates an exemplary user interaction with a cloud environment operating system in which a single user uses a single deployment to manage multiple computing environments within a cloud service provider.

In the example of FIG. 9, in substantially the same manner as described with respect to FIG. 8, a user 960 can interact with a cloud environment operating system 908 through the use of a compiled domain specific language file created by the user that is configured to interface with a command line interface 904. In some embodiments, DSL file 902 contains the declaration of the target infrastructure to be created, updated, and/or managed; the user may issue commands against the command line interface (CLI) that may accept a DSL file as an argument (e.g., fugue run ludwigfile or fugue update ProcessId). Such a command may cause a call to be issued against the cloud environment operating system and may pass the argument as input.

In the example of FIG. 9, the single instance of the cloud environment operating system 908 can be used to build and manage to separate cloud computing environments 910 and 914. The user 960 can thus create multiple domain specific language files 902 that can each be used to specify a distinct computing environment. The cloud environment operating system instance 908 deployed in the cloud service provider account 912 of the user within the cloud service provider 906 can implement and maintain numerous environments based on the user's specification.

Figure 10:
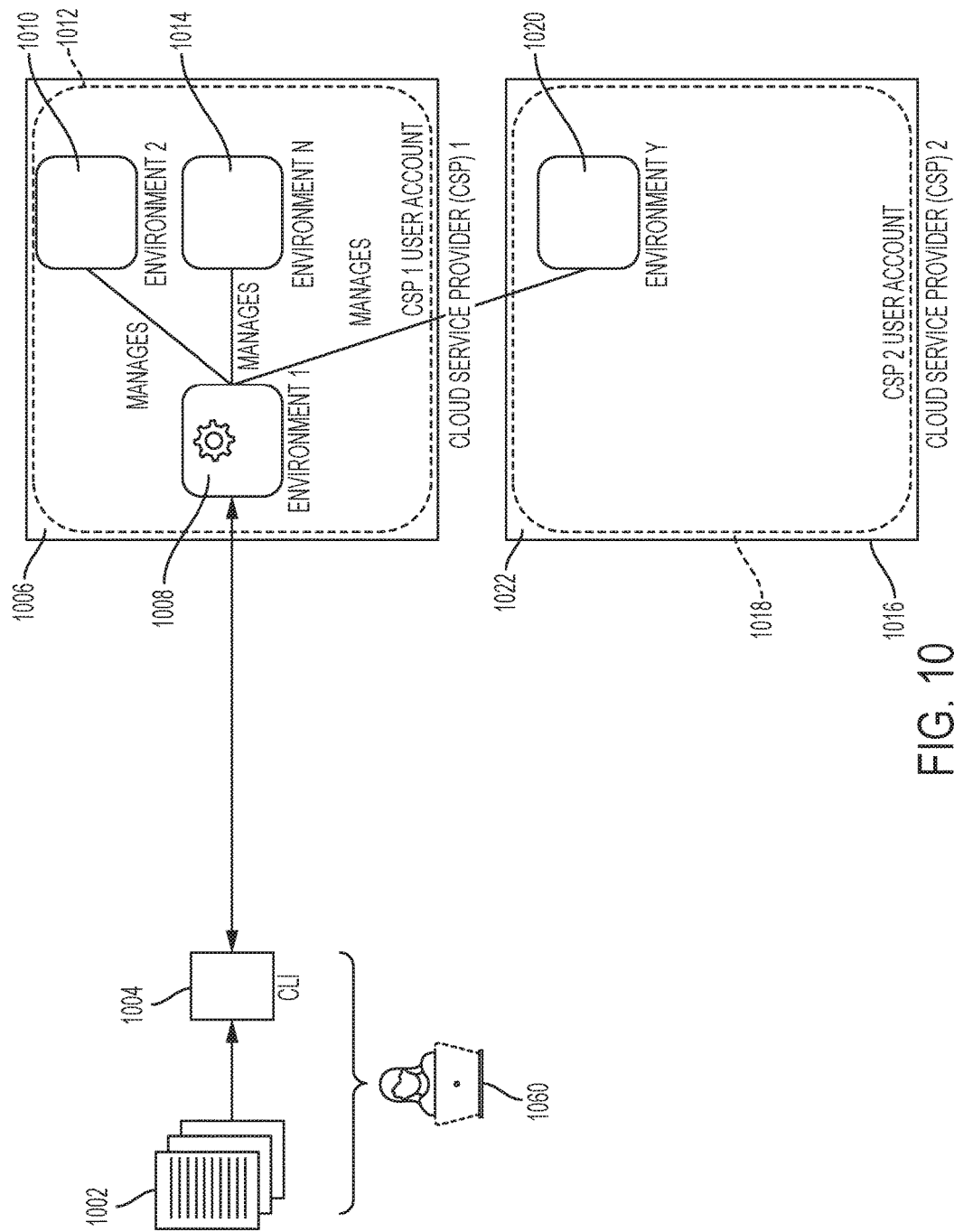
FIG. 10 illustrates another exemplary user interaction with a cloud environment operating system according to examples of the disclosure.

While the user accesses the cloud environment operating system within a single cloud service provider, the user may not be limited to specifying cloud infrastructure for the single cloud service provider, and instead can specify cloud computing environments that can be implemented in multiple cloud service providers. FIG. 10 illustrates an exemplary user interaction with a cloud computing environment in which a single instance of the cloud environment operating system can implement and maintain cloud computing environments in multiple cloud service providers.

In the example of FIG. 10, in substantially the same manner as described with respect to FIG. 8, a user 1060 can interact with a cloud environment operating system 1008 through the use of one or more compiled domain specific language files 1002 created by the user The DSl files may declare infrastructure elements. The user may invoke the command line interface issuing commands that may accept a DSL file as an argument (e.g., fugure run ludwigfile), which may issue calls against the cloud environment operating system and pass the argument as input.

In the example of FIG. 10, while the cloud environment operating system 1008 can be deployed within a user account 1012 of a cloud service provider 1006, the cloud environment operating system can be used to manage computing environment in a second user account 1018 of a second cloud service provider 1022. As an example the first cloud service provider could be Amazon Web Services while the second cloud service provider 1016 could be Google's Cloud Platform. In this way, a single user could utilize a single deployment of a cloud environment operating system within a cloud service provider, to manage multiple computing environments stored and implemented in multiple cloud computing service provider platforms.

Figure 11:
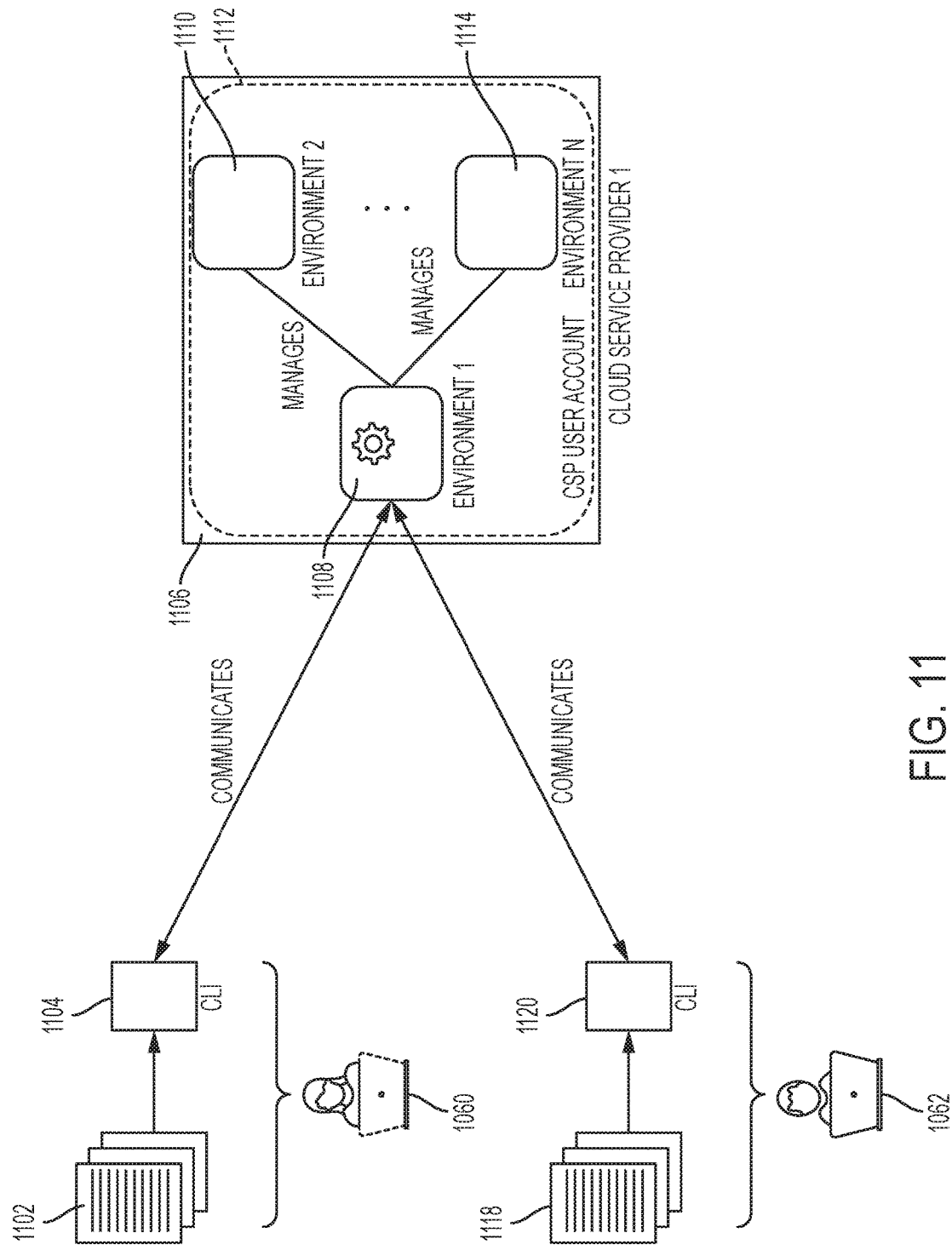
FIG. 11 illustrates another exemplary user interaction with a cloud environment operating system according to examples of the disclosure.

A single deployment of a cloud environment operating system within a cloud service provider can also be utilized by multiple users to create multiple computing environments. FIG. 11 illustrates an exemplary multi-user interaction with cloud environment operating system according to examples of the disclosure. In the example of FIG. 11, multiple users 1160 and 1162 can interact with a single instance of a cloud environment operating system 1108 deployed within a single user account 1112 provided by cloud service provider 1106. In this context, while multiple user 1160 and 1162 can create domain specific language files 1102 and 118, a single deployed cloud environment operating system 1108 can use the compiled code to create multiple environments 1110 and 1114 within a single user account within the cloud service provider 1106. This type of user interaction can be useful in an enterprise computing environment in which multiple technicians can create multiple cloud computing environments using a single operating system deployed within a cloud provider.

Figure 12:
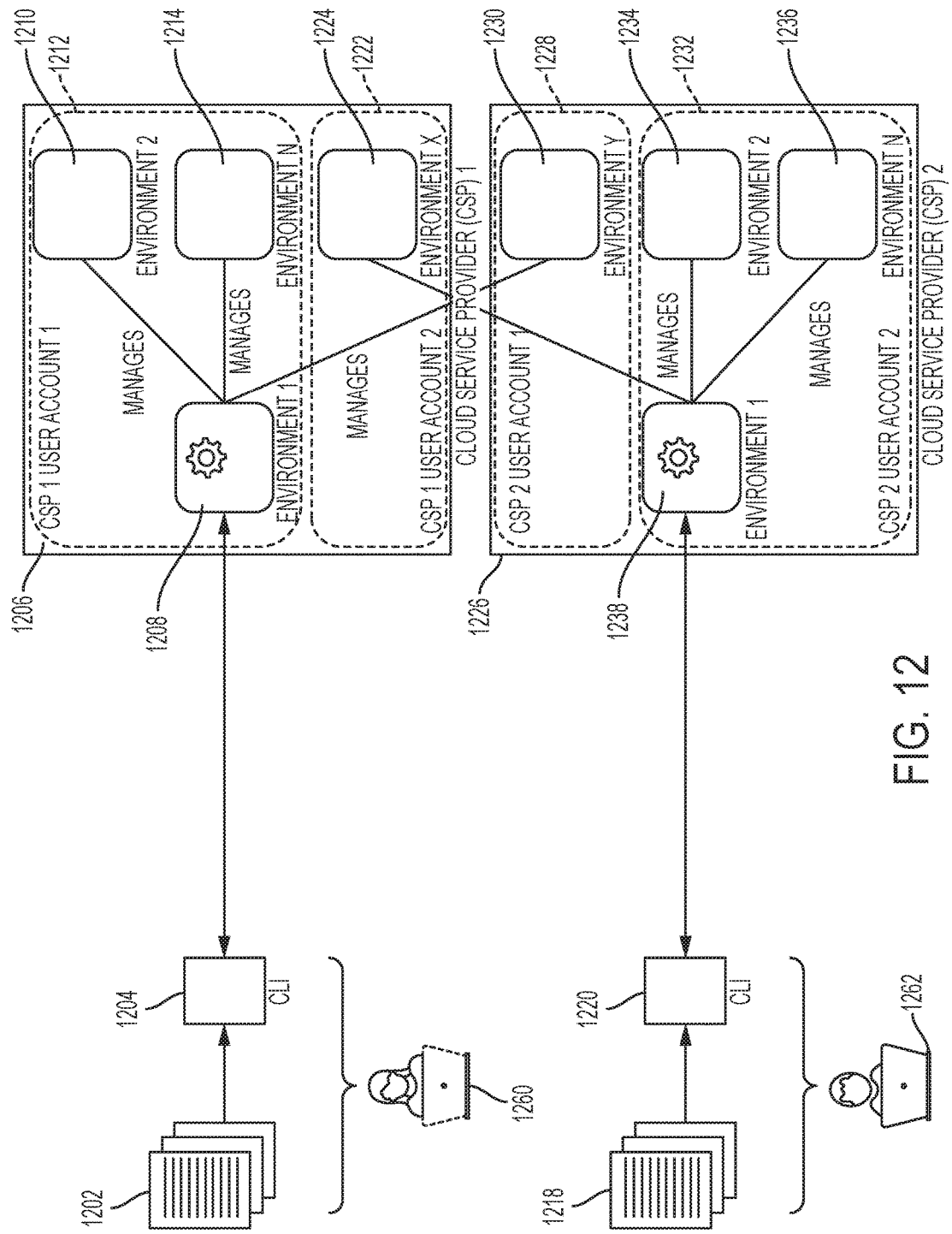
FIG. 12 illustrates another exemplary user interaction with a cloud environment operating system according to examples of the disclosure.

In another scenario, rather than having multiple users share a common deployed cloud computing system, the multiple users can operate parallel computing environments using multiple cloud environment operating systems deployed in multiple cloud service provider accounts. FIG. 12 illustrates an exemplary multi-user interaction with multiple cloud environment operating systems according to examples of the disclosure.

In the example of FIG. 12, a first user 1260 can create domain specific language files 1204 that via command line interface 1204 can access a cloud environment operating system 1208. Cloud environment operating system 1208 can be deployed within a first user account 1212 of a cloud service provider 1206. Using the cloud environment operating system 1208, the first user 1260 can create multiple cloud computing environments 1210 and 1214 within the cloud service provider 1206. Additionally, the user 1260 via cloud environment operating system 1208 can create computing environments 1230 within a user account 1228 of cloud service provider 1226.

In parallel to the operations of user 1260, an additional user 1262 can create domain specific language files 1218 that via CLI 1220 can create cloud computing environments via cloud environment operating system 1238. Cloud environment operating system 1238 can be deployed on a second cloud service provider 1226 and can be used to create computing environments 1234 and 1236 on a second user account 1232 located within cloud service provider 1226. Additionally, cloud environment operating system 1238 can be used to create cloud computing environment 1224 on a second user account 1222 located within cloud service provider 1206.

As the examples of FIGS. 8-12 illustrate, while cloud computing operating systems may be implemented in a particular cloud service provider, nonetheless they can be used to create multiple computing environments within the same cloud service provider, or can be used to create cloud computing environments in cloud service providers that are external to the cloud computing environment in which the cloud environment operating system may be implemented. Additionally, multiple users can either share a common deployed cloud computing operating system or use separate instances of a cloud computing system.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for building infrastructure on a cloud computing system, the method comprising:
receiving a high level declaration of a computing infrastructure to be built on the cloud computing system, wherein the high level declaration comprises a domain-specific programming language configured to allow a user to express infrastructure elements and relationships between the expressed infrastructure elements;
generating a resource table, wherein the resource table is based on the received high level declaration;
generating a low level declaration of the computing infrastructure, wherein generating the low level declaration includes adding information to the resource table, and wherein the added information is based on the received declaration and the cloud computing system on which the infrastructure is to be built;
converting the low level declaration to one or more instructions readable by the cloud computing system; and
executing the one or more instructions on the cloud computing system to build the computing infrastructure.

2. The method of claim 1, wherein the method further comprises checking the received high-level declaration for errors prior to the computing infrastructure being built on the cloud computing system.

3. The method of claim 1, wherein converting the low level declaration to one or more instructions readable by the cloud computing system includes interfacing with an application program interface of the cloud computing system.

4. The method of claim 1, further comprising determining if sufficient information has been added to the resource table such that the computing infrastructure can be built on the cloud computing system.

5. The method of claim 1, wherein the method further comprises:
enforcing one or more policies of the cloud computing system on the generated low level declaration.

6. A method for building a plurality of computer infrastructure systems from multiple users on a cloud computing system, the method comprising:
receiving a first high level declaration of a first computing infrastructure to be built on the cloud computing system from a first user, wherein the first high level declaration comprises a domain-specific programming language configured to allow a user to express infrastructure elements and relationships between the expressed infrastructure elements;
receiving a second high level declaration of a second computing infrastructure to be built on the cloud computing system from a second user, wherein the second high level declaration comprises the domain-specific programming language configured to allow a user to express infrastructure elements and relationships between the expressed infrastructure elements;
converting the first high level declaration and the second high level declaration of a first and second computing infrastructure into one or more instructions readable by the cloud computing system, wherein converting includes generating a first resource table and a second resource table, wherein the first resource table is based on the first received high level declaration, wherein the second resource table is based on the second received high level declaration, and wherein converting includes converting the first and second resource tables into the one or more instructions readable by the cloud computing system; and
building the first and second computing infrastructures on the cloud based on the one or more instructions.

7. The method of claim 6, wherein converting the first high level declaration and second high level declaration comprises:
generating a first low level declaration and a second low level declaration, wherein generating the first low level and second low level declaration includes adding information to the first and second resource tables, and wherein the added information is based on the received first and second declaration and the cloud computing system on which the first and second computing infrastructures are to be built.

8. The method of claim 7, further comprising:
converting the first low level declaration and the second low level declaration to the one or more instructions readable by the cloud computing system.

9. The method of claim 8, wherein converting the first low level declaration and the second low level declaration includes interfacing with an application program interface of the cloud computing system.

10. The method of claim 6, further comprising determining if sufficient information has been added to the first and second resource tables such that the first and second computing infrastructure can be built on the cloud computing system.

11. The method of claim 6, wherein the method further comprises checking the received first and second high-level declarations for errors prior to the first and second computing infrastructures being built on the cloud computing system.

12. A method for implementing a user specified computing infrastructure on a cloud computing system, the method comprising:
receiving a high level declaration of a computing infrastructure to be built on the cloud computing system, wherein the high level declaration comprises a domain-specific programming language configured to allow a user to express infrastructure elements and relationships between the expressed infrastructure elements;
converting the high level declaration into one or more instructions readable by the cloud computing system, wherein converting the high level declaration includes generating a resource table, wherein the resource table is based on the received high level declaration, and converting the generated resource table into the one or more instructions readable by the cloud computing system;

building the computing infrastructure on the cloud based on the one or more instructions;
comparing the built computing infrastructure to the received high level declaration of the computing infrastructure; and
modifying the built computing infrastructure based on the comparison between the built computing infrastructure and the received high level declaration of the computing infrastructure.

13. The method of claim 12, wherein converting the high level declaration comprises:
generating a low level declaration, wherein generating the low level declaration includes adding information to the resource table, and wherein the added information is based on the received high level declaration and the cloud computing system on which the computing infrastructure is to be built.

14. The method of claim 12, further comprising:
converting the low level declaration to the one or more instructions readable by the cloud computing system.

15. The method of claim 12, wherein comparing the built computing infrastructure to the received high level declaration of the computing infrastructure comprises:
receiving a status of the built infrastructure; and
comparing the status of the built infrastructure to a specification of the infrastructure contained within the high level declaration.

16. The method of claim 15, wherein modifying the built computing infrastructure comprises:
generating a low level declaration of one or more modifications to be made to the built infrastructure; and
converting the low level declaration of the one or more modification into one or more instructions to be executed by the cloud computing system.

17. The method of claim 12, wherein the comparing takes place at pre-determined time intervals.

18. The method of claim 12, further comprising:
enforcing one or more policies of the cloud computing system on the generated low level declaration.

19. A non-transitory computer readable storage medium storing one or more programs, the one or more programs comprising instructions for creating instructions to build computing infrastructure on a cloud based computing system, which when executed by a portable electronic device, cause the device to:
receive a high level declaration of a computing infrastructure to be built on the cloud computing system, wherein the high level declaration comprises a domain-specific programming language configured to allow a user to express infrastructure elements and relationships between the expressed infrastructure elements;
generate a resource table, wherein the resource table is based on the received high level declaration;
generating a low level declaration of the computing infrastructure, wherein generating the low level declaration includes adding information to the resource table, and wherein the added information is based on the received declaration and the cloud computing system on which the infrastructure is to be built;
convert the low level declaration to one or more instructions readable by the cloud computing system; and
execute the one or more instructions on the cloud computing system to build the computing infrastructure.

20. The non-transitory computer readable medium of claim 19, wherein the device is further caused to check the received high-level declaration for errors prior to the computing infrastructure being built on the cloud computing system.

21. The non-transitory computer readable medium of claim 19, wherein converting the low level declaration to one or more instructions readable by the cloud computing system includes interfacing with an application program interface of the cloud computing system.

22. The non-transitory computer readable medium of claim 19, further comprising determining if sufficient information has been added to the resource table such that the computing infrastructure can be built on the cloud computing system.

23. The non-transitory computer readable medium of claim 19, wherein the device is further caused to:
enforce one or more policies of the cloud computing system on the generated low level declaration.

24. A non-transitory computer readable storage medium storing one or more programs, the one or more programs comprising instructions for building a plurality of computer infrastructure systems from multiple users on a cloud computing system, which when executed by a portable electronic device, cause the device to:
receive a first high level declaration of a first computing infrastructure to be built on the cloud computing system from a first user, wherein the first high level declaration comprises a domain-specific programming language configured to allow a user to express infrastructure elements and relationships between the expressed infrastructure elements;
receive a second high level declaration of a second computing infrastructure to be built on the cloud computing system from a second user, wherein the second high level declaration comprises the domain-specific programming language configured to allow a user to express infrastructure elements and relationships between the expressed infrastructure elements;
convert the first high level declaration and the second high level declaration of a first and second computing infrastructure into one or more instructions readable by the cloud computing system, wherein converting includes generating a first resource table and a second resource table, wherein the first resource table is based on the first received high level declaration, wherein the second resource table is based on the second received high level declaration, and wherein converting includes converting the first and second resource tables into the one or more instructions readable by the cloud computing system; and
build the first and second computing infrastructures on the cloud based on the one or more instructions.

25. The non-transitory computer readable medium of claim 24, wherein converting the first high level declaration and second high level declaration comprises:
generating a first low level declaration and a second low level declaration, wherein generating the first low level and second low level declaration includes adding information to the first and second resource tables, and wherein the added information is based on the received first and second declaration and the cloud computing system on which the first and second computing infrastructures are to be built.

26. The non-transitory computer readable medium of claim 25, wherein the device is further caused to:
convert the first low level declaration and the second low level declaration to the one or more instructions readable by the cloud computing system.

27. The non-transitory computer readable medium of claim 26, wherein converting the first low level declaration and the second low level declaration includes interfacing with an application program interface of the cloud computing system.

28. The non-transitory computer readable medium of claim 24, wherein the device is further caused to:
determine if sufficient information has been added to the first and second resource tables such that the first and second computing infrastructure can be built on the cloud computing system.

29. The non-transitory computer readable medium of claim 24, wherein the device is further caused to check the received first and second high-level declarations for errors prior to the and second computing infrastructures being built on the cloud computing system.

30. A non-transitory computer readable storage medium storing one or more programs, the one or more programs comprising instructions for implementing a user specified computing infrastructure on a cloud computing system, which when executed by a portable electronic device, cause the device to:
receive a high level declaration of a computing infrastructure to be built on the cloud computing system, wherein the high level declaration comprises a domain-specific programming language configured to allow a user to express infrastructure elements and relationships between the expressed infrastructure elements;
convert the high level declaration into one or more instructions readable by the cloud computing system, wherein converting the high level declaration includes generating a resource table, wherein the resource table is based on the received high level declaration, and converting the generated resource table into the one or more instructions readable by the cloud computing system;
build the computing infrastructure on the cloud based on the one or more instructions;
compare the built computing infrastructure to the received high level declaration of the computing infrastructure; and
modify the built computing infrastructure based on the comparison between the built computing infrastructure and the received high level declaration of the computing infrastructure.

31. The non-transitory computer readable medium of claim 30, wherein converting the high level declaration comprises:
generating a low level declaration, wherein generating the low level declaration includes adding information to the resource table, and wherein the added information is based on the received high level declaration and the cloud computing system on which the computing infrastructure is to be built.

32. The non-transitory computer readable medium of claim 30, wherein the device is further caused to:
convert the low level declaration to the one or more instructions readable by the cloud computing system.

33. The non-transitory computer readable medium of claim 30, wherein comparing the built computing infrastructure to the received high level declaration of the computing infrastructure comprises:
receiving a status of the built infrastructure; and
comparing the status of the built infrastructure to a specification of the infrastructure contained within the high level declaration.

34. The non-transitory computer readable medium of claim 33, wherein modifying the built computing infrastructure comprises:
generating a low level declaration of one or more modifications to be made to the built infrastructure; and
converting the low level declaration of the one or more modification into one or more instructions to be executed by the cloud computing system.

35. The non-transitory computer readable medium of claim 30, wherein the comparing takes place at pre-determined time intervals.

36. The non-transitory computer readable medium of claim 30, wherein the device is further caused to:
enforce one or more policies of the cloud computing system on the generated low level declaration.

37. A method for checking for errors in a computing infrastructure declaration, the method comprising:
receiving a high level declaration of a computing infrastructure to be built on the cloud computing system, wherein the high level declaration comprises a domain-specific programming language configured to allow a user to express infrastructure elements and relationships between the expressed infrastructure elements;
determining if one or more errors exist in the high level declaration;
notifying a creator of the high level declaration if it is determined that one or more errors exist in the high level declaration; and
generating one or more instructions to be executed on the cloud computing system to create the computing infrastructure if it is determined that the high level declaration does not contain any errors, wherein generating the one or more instructions to be executed on the cloud computing system includes generating a resource table, wherein the resource table is based on the received high level declaration, and wherein generating the one or more instructions includes converting the resource table into the one or more instructions readable by the cloud computing system.

* * * * *